(12) United States Patent
Vandamme

(10) Patent No.: US 12,152,637 B2
(45) Date of Patent: Nov. 26, 2024

(54) INSTRUMENTED BEARING INCORPORATING A LEAKAGE CURRENT COLLECTOR AND A MAGNETIC SHIELD

(71) Applicant: NTN-SNR Roulements, Annecy (FR)

(72) Inventor: Etienne Vandamme, Alleves (FR)

(73) Assignee: NTN-SNR Roulements, Annecy (FR)

( * ) Notice: Subject to any disclaimer, the term of this patent is extended or adjusted under 35 U.S.C. 154(b) by 223 days.

(21) Appl. No.: 17/796,104

(22) PCT Filed: Jan. 29, 2021

(86) PCT No.: PCT/EP2021/052095
§ 371 (c)(1),
(2) Date: Jul. 28, 2022

(87) PCT Pub. No.: WO2021/152082
PCT Pub. Date: Aug. 5, 2021

(65) Prior Publication Data
US 2023/0084943 A1 Mar. 16, 2023

(51) Int. Cl.
*F16C 41/00* (2006.01)
*F16C 19/52* (2006.01)
*G01P 3/44* (2006.01)

(52) U.S. Cl.
CPC ............ *F16C 41/007* (2013.01); *F16C 19/52* (2013.01); *F16C 41/002* (2013.01); *G01P 3/443* (2013.01); *F16C 2326/20* (2013.01); *F16C 2380/26* (2013.01)

(58) Field of Classification Search
CPC ...... F16C 19/52; F16C 41/002; F16C 41/007; F16C 2233/00; F16C 2326/20; F16C 2380/26; G01P 3/443; B60B 27/0068
See application file for complete search history.

(56) References Cited

U.S. PATENT DOCUMENTS

| 2004/0012286 A1 | 1/2004 | Zens | |
|---|---|---|---|
| 2006/0039639 A1* | 2/2006 | Aoki | G01P 1/026 384/448 |
| 2020/0173494 A1* | 6/2020 | Smith | H02K 7/088 |

(Continued)

FOREIGN PATENT DOCUMENTS

| DE | 19910130 A1 | 9/2000 |
|---|---|---|
| DE | 20011138 U1 | 10/2001 |
| DE | 102015223509 A1 | 3/2017 |

(Continued)

*Primary Examiner* — Alan B Waits
(74) *Attorney, Agent, or Firm* — The Webb Law Firm

(57) ABSTRACT

An instrumented bearing comprising a stationary outer ring and a rotating inner ring is provided with an encoder, a sensor assembly comprising a read head positioned opposite and at a reading distance from the encoder, and a leakage current collector capable of coming into sliding contact with an annular contact which can be rigidly connected, directly or indirectly, to the inner ring. The encoder and the read head are positioned axially between the outer ring and the leakage current collector. A conductive electrical connection between the leakage current collector and the stationary outer ring also forms a magnetic shield of ferromagnetic material, extending from the outer ring to the leakage current collector by surrounding the encoder and the read head.

17 Claims, 3 Drawing Sheets

(56) References Cited

U.S. PATENT DOCUMENTS

2020/0173531 A1\* 6/2020 Smith ................... F16H 57/037
2021/0088076 A1\* 3/2021 Knoblauch ............. F16C 19/52

FOREIGN PATENT DOCUMENTS

| DE | 102018117315 A1 | 1/2020 | |
|---|---|---|---|
| EP | 1335059 A1 | 8/2003 | |
| EP | 1872463 B1 | 5/2011 | |
| WO | WO-2012085617 A1 \* | 6/2012 | .......... F16C 33/7886 |

\* cited by examiner

INSTRUMENTED BEARING INCORPORATING A LEAKAGE CURRENT COLLECTOR AND A MAGNETIC SHIELD

CROSS-REFERENCE TO RELATED APPLICATIONS

This application is the United States national phase of International Application No. PCT/EP2021/052095 filed Jan. 29, 2021, and claims priority to French Patent Application No. 2000940 filed Jan. 30, 2020, the disclosures of which are hereby incorporated by reference in their entirety.

BACKGROUND OF THE INVENTION

Field of the Invention

The invention relates to an instrumented bearing intended to guide a moving assembly in rotation with respect to a support, the moving assembly having to be electrically connected to the support.

Description of Related Art

The motors of electric/hybrid vehicles are subject to failures due to the passage of current in the rolling bearings that equip them. These leakage currents can also affect the measurements or lead to failures of the sensors with which these bearings may be equipped.

There are current return systems using graphite brushes, or better still, carbon fiber brushes, as described for example in document EP 1 872 463, which are claimed to be indestructible and maintenance-free. It is, however, a non-integrated component to be added to the motor, which requires an additional assembly operation and contributes to additional axial bulk.

In document DE 199 10 130 A1, a pulse measuring device is described that is intended to be fixed on a rotating shaft to determine the speed of revolution, which incorporates an electrical connection for returning leakage currents. This pulse sensor comprises a stationary outer ring, forming an annular guide track, an inner ring forming an annular guide track located opposite the guide track of the outer ring, the inner ring being movable relative to the outer ring about an axis of revolution that is an axis of symmetry of revolution of the guide track of the outer ring and of the guide track of the inner ring, an annular encoder secured to the inner ring, a sensor assembly secured to the outer ring, the sensor assembly comprising a read head positioned facing and at a reading distance from the annular encoder, and a leakage current collector, capable of coming into sliding contact with an annular contact secured indirectly to the inner ring. Such a device, however, has a large axial bulk, and does not allow protection of the sensor against the surrounding electromagnetic disturbances.

In document EP 1 335 059, it has been proposed to equip a drum machine with an instrumented rolling bearing comprising an electrical connection between conductive elements associated respectively with the drum and with the frame of the machine. The electrical connection comprises a conductive blade secured at one end to a fixed part of the sensor assembly associated with the machine, and rubbing at its other end against a rotating part of the instrumented rolling bearing. This electrical connection is arranged either between the sensor unit and a conductive encoder wheel, or between the sensor unit and a rotating ring of the rolling bearing. Here one gains in axial compactness, but the sensor remains sensitive to the surrounding electromagnetic disturbances.

SUMMARY OF THE INVENTION

The invention aims to remedy the drawbacks of the state of the art and to propose an instrumented bearing with integrated leakage current return, which is less sensitive to electromagnetic disturbances, as can be found, in particular, in the environment of the electric propulsion motors of electric or hybrid road vehicles.

To do this, proposed according to a first aspect of the invention is an instrumented bearing, comprising:
- a stationary outer ring, forming at least one annular guide track,
- an inner ring forming at least one annular guide track located opposite the guide track of the outer ring, the inner ring being movable in rotation relative to the outer ring about an axis of revolution that is an axis of symmetry of revolution of the guide track of the outer ring and of the guide track of the inner ring,
- an annular encoder secured to the inner ring,
- a sensor assembly secured to the outer ring, the sensor assembly comprising a read head positioned opposite and at a reading distance from the encoder, and
- a leakage current collector, capable of coming into sliding contact with an annular contact that can be secured directly or indirectly to the inner ring, and
- a conductive electrical connection between the leakage current collector and the stationary outer ring.

According to the invention, the encoder and the read head are positioned axially between the outer ring and the leakage current collector, and the conductive electrical connection constitutes a magnetic shield made of a ferromagnetic material, extending from the outer ring to the leakage current collector by surrounding the encoder and the read head.

An instrumented bearing combining the functions of rotational guidance and reading of an encoder is thus incorporated with additional current return functions, in particular for earthing the rotating assembly guided by the bearing, and magnetic shielding of the read head, the current return being able to further contribute, if necessary, to high-frequency electromagnetic shielding of the read head.

The bearing may be a sliding bearing, or preferably a rolling bearing, comprising rolling elements circulating on the guide tracks.

The encoder may comprise one or more multipolar tracks. It is preferably a magnetic encoder. Such an encoder comprises one or more tracks, each consisting of alternating north and south magnetic poles, which may or may not be regular.

Alternatively, the encoder may be a tone wheel. The read head comprises one or more elements sensitive to the magnetic field variations produced by the encoder.

The read head can face the encoder in the axial direction, in which case the encoder is preferably located between the read head and the inner ring of the bearing. Alternatively, the read head may face the encoder in the radial direction, in which case the read head preferably lies radially outside the encoder.

According to one embodiment, the leakage current collector comprises a brush rubbing against the annular contact. This can be the graphite or carbon fiber brush, for maximum longevity.

According to one embodiment, it is provided that, at rest, the leakage current collector is in contact with the annular contact over an angular sector greater than 270°. Preferably, it is provided that at rest, that at rest, the leakage current collector is in annular contact with the annular contact. The leakage current collector thus contributes to the high-frequency electromagnetic shielding of the read head.

According to one embodiment, the annular contact is formed by an annular sleeve that has one or more of the following features:
  the sleeve extends in the axial direction so as to overlap axially with a face of the encoder that faces the read head;
  the sleeve extends in the axial direction so as to overlap axially with the read head;
  the sleeve bears directly or indirectly against the inner ring;
  the sleeve is electrically connected to the inner ring;
  the sleeve is electrically connected to the shaft;
  the sleeve has a cylindrical friction surface for the leakage current collector;
  the sleeve has a flange projecting radially outward, the leakage current collector being positioned axially between the flange and the read head.

The flange contributes to guiding the magnetic field lines by reducing the distance between the magnetic shield and the rotating assembly guided by the bearing.

The sleeve can advantageously be made of ferromagnetic material such as soft iron, steel, in particular a ferritic or martensitic stainless steel, or mu-metal.

According to various embodiments, it is provided that the magnetic shield has one or more of the following features:
  the magnetic shield comprises at least one sheet of ferromagnetic and electrically conductive material;
  the magnetic shield comprises several superimposed sheets of ferromagnetic and electrically conductive material;
  the magnetic shield comprises a cylindrical portion covering the read head;
  the magnetic shield comprises an end portion extending radially from an end of the cylindrical portion covering the read head radially inward and toward the leakage current collector.

In a known manner, the magnetic shield is reinforced by stacking the sheets so as to form a strip.

According to one embodiment, part of the leakage current collector is clamped between two sheets of the magnetic shield. Preferably, a first of the two sheets extends axially to form a cylindrical portion covering the read head, the second of the two sheets preferably having one of the following features:
  the second of the two sheets does not extend axially to form a cylindrical portion covering the read head;
  the second of the two sheets extends axially to form a cylindrical portion covering the read head;
  the second of the two sheets is positioned between the first of the two sheets and the read head;
  the first of the two sheets is positioned between the second of the two sheets and the read head.

For a particularly simple assembly, it is provided for the magnetic shield to be crimped, shrunk, glued, welded to the outer ring.

According to a particularly advantageous embodiment, the sensor assembly is secured to the outer ring via the magnetic shield.

According to one embodiment, the magnetic shield comprises an opening for the passage of electrical conductors between the read head and an electrical device of the sensor assembly, positioned outside the magnetic shield, one of the following features being preferably carried out:
  the opening is positioned in a cylindrical wall of the magnetic shield;
  the opening is positioned in a transverse wall of the magnetic shield.

BRIEF DESCRIPTION OF FIGURES

Other features and advantages of the invention will emerge on reading the following disclosure, with reference to the appended figures, which illustrate.

For greater clarity, identical or similar elements are identified by identical reference signs in all of the figures.

DESCRIPTION OF THE INVENTION

Figure 1:
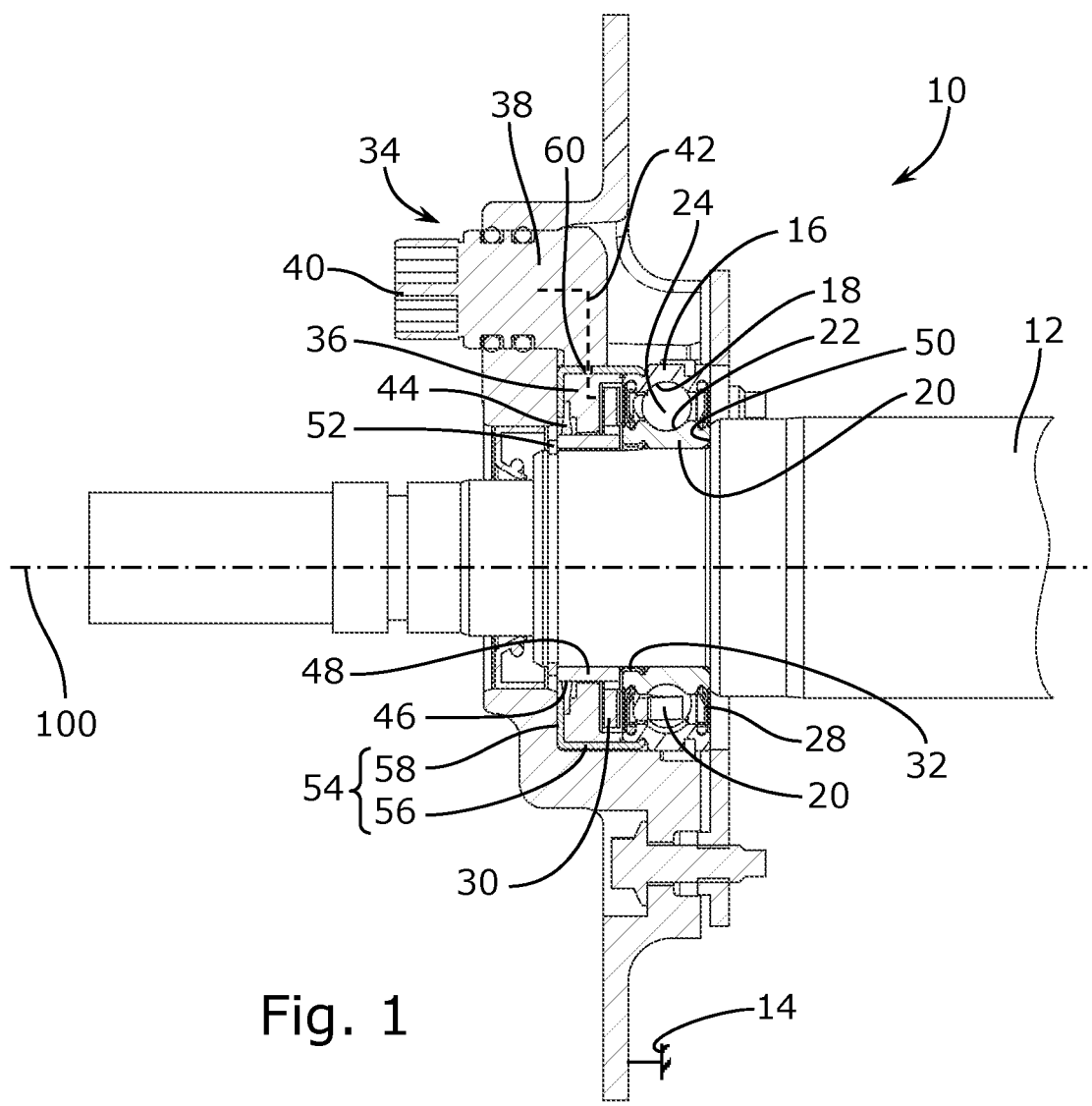
FIG. 1, an instrumented bearing according to a first embodiment of the invention.

FIG. 1 shows an instrumented bearing 10 mounted on a shaft 12 rotating relative to a stationary structure 14. The bearing 10 is a rolling bearing, comprising a stationary outer ring 16, forming an annular guide track 18, an inner ring 20 forming an annular guide track 22 located opposite the guide track 18 of the outer ring 16, rolling bodies 24 circulating on the guide tracks 18, 22, if necessary a cage 26 for holding the rolling bodies, and if necessary seals 28 to protect the rolling bodies 24 and the guide tracks 18, 22 from mechanical or chemical external attacks, or else to confine the lubrication in the bearing area, or even to perform these two functions simultaneously. In known manner, the inner ring 20, which is shrunk on the shaft 12, is rotatable relative to the outer ring 16 about an axis of revolution 100, which is an axis of symmetry of revolution of the guide track 18 of the outer ring 16 and the guide track 22 of the inner ring 20.

An annular encoder 30 is secured to the inner ring 20 by any appropriate means, for example by means of an encoder carrier 32 crimped or shrunk on an inner perimeter of the inner ring 20.

A sensor assembly 34 is secured to the outer ring 16. This sensor assembly 34 comprises a read head 36 positioned axially opposite and at a reading distance from the annular encoder 30, a sensor body 38 made of insulating and non-magnetic material that supports an electrical device 40, which may for example be an electrical connector, an electrical cable, a cable gland or, where applicable, an electronic signal processing card, and a wired electrical connection 42 between the read head 36 and the electrical device 40. In this embodiment, the encoder 30 is located between the rings 16, 20 of the bearing 10 and the read head 36.

The instrumented bearing 10 also comprises a leakage current collector 44 secured to the sensor assembly 34, and here consisting of an annular brush completely surrounding the shaft 12 and coming radially into sliding contact against a cylindrical friction surface 46 of an annular metallic sleeve 48 directly shrunk on the shaft 12. The encoder 30 and the read head 36 are positioned axially between the outer ring 16 and the leakage current collector 44.

Preferably, the sleeve 48 extends in the axial direction under the read head 36, and if necessary under the encoder 30, so as to be axially overlapping with at least the read head 36, and preferably with a face of the encoder 30 that faces the read head 36.

The encoder carrier 32 is clamped between the sleeve 48 and the inner ring 20. The assembly is stopped axially by a shoulder 50 of the shaft 12 and by an elastic ring 52. The encoder carrier is metallic in a ferromagnetic material so as to form an electrical connection between the inner ring of the bearing and the sleeve, and to guide the field lines around the encoder 30.

A conductive electrical connection 54 between the leakage current collector 44 and the outer ring 16 of the bearing 10 is constituted by an annular sheet of electrically conductive material, which extends from the outer ring 16 to the leakage current collector 44 surrounding the encoder 30 and the read head 36. An electrical path is thus established between the shaft 12 and the conductive electrical connection 54, which travels through the sleeve 48 shrunk on the shaft 12 and the leakage current collector 44 bypassing the inner ring 20 and the outer ring 16 of the bearing 10, as well as the guide tracks 18, 22 and the rolling elements 24.

More specifically, this electrical connection comprises a cylindrical portion 56 covering the read head 36 and a planar annular portion 58 extending from one end of the cylindrical portion 56 radially inward and toward the leakage current collector 44. The mechanical attachment of the electrical connection 54 to the outer ring 16 can be obtained in particular by crimping, hooping, or any other means preserving an electrical contact, for example by gluing or welding, or by fastening elements.

A small opening 60 is formed in the cylindrical portion 56 for the passage of the electrical conductors 42 between the read head 36 and the electrical device 40.

In this embodiment, the sensor body made from insulating material 38 of the sensor assembly 34 is molded onto the sheet 54, which thus has a mechanical function of supporting the sensor assembly 34 and securing the sensor assembly 34 to the outer ring 16, as well as, if necessary, an angular indexing function of the sensor relative to the stationary structure 14. The leakage current collector 44 is clamped between a wall of the sheet 54 and the read head 36.

Remarkably, the electrical connection 54 between the leakage current collector 44 and the outer ring 16 is made of a ferromagnetic material, so as to form a magnetic shield around the read head 36 and the encoder 30. The accumulation of the mechanical, electrical and magnetic functions of this part will lead to the preference for ferromagnetic materials such as soft iron, steel, in particular a ferritic or martensitic steel, or mu-metal. Preferably, the constituent material of the outer ring 16, the main function of which naturally remains the guiding of the rolling bodies 24, is also ferromagnetic, so as to participate in guiding the magnetic field lines around the read head 36, which will make a steel with the mechanical characteristics required by the application preferable for this part, in particular at the raceways.

Figure 2:
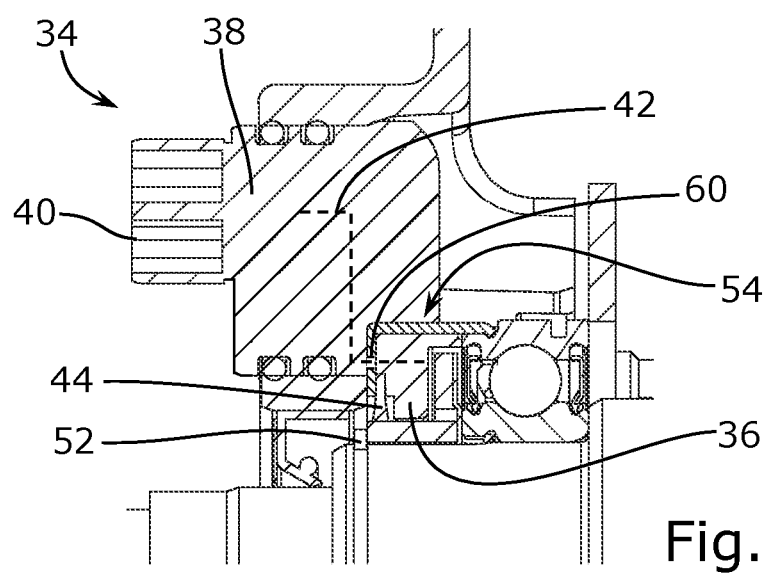
FIG. 2, a detail of an instrumented bearing according to a second embodiment of the invention.

According to a second embodiment, illustrated in FIG. 2, the passage opening 60 of the conductors 42 connecting the read head 36 to the electrical device 40 is formed in the planar end wall 58 of the conductive electrical connection 54.

Figure 3:
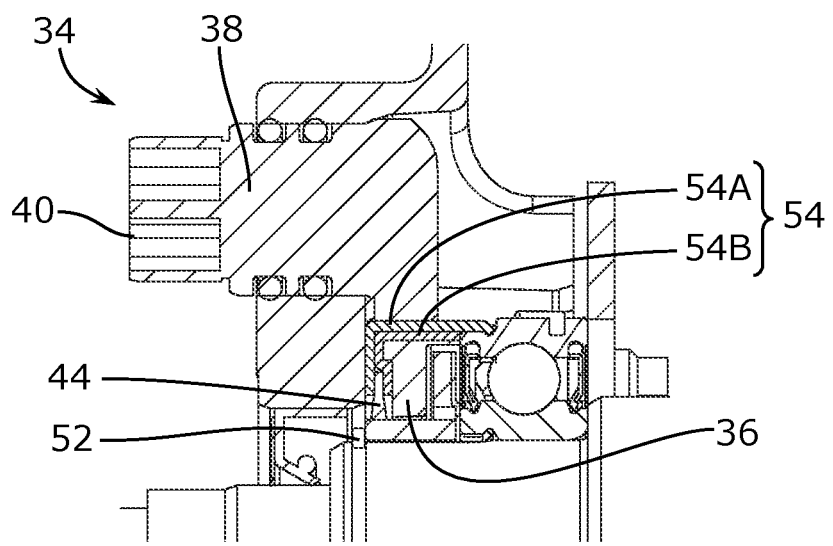
FIG. 3, a detail of an instrumented bearing according to a third embodiment of the invention.

According to a third embodiment, illustrated in FIG. 3, the conductive electrical connection 54 is constituted by a plurality of sheets, here by two sheets 54A, 54B, which both have a cylindrical part surrounding the read head and/or the encoder to improve the magnetic shield performance, and an end portion serving to attach the leakage current collector. In practice, the leakage current collector 44 is clamped between the two sheets 54A, 54B. The two sheets 54A, 54B can be mounted tight, or glued.

Figure 4:
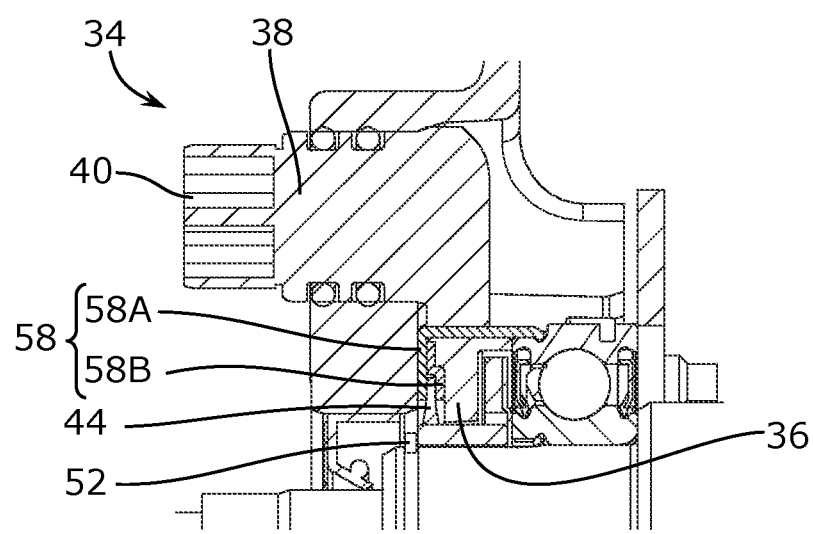
FIG. 4, a detail of an instrumented bearing according to a fourth embodiment of the invention.

According to a fourth embodiment illustrated in FIG. 4, only the end portion 58 of the conductive electrical connection 54 comprises two sheets 58A, 58B, for example welded to each other, serving to clamp the leakage current collector 44.

Figure 5:
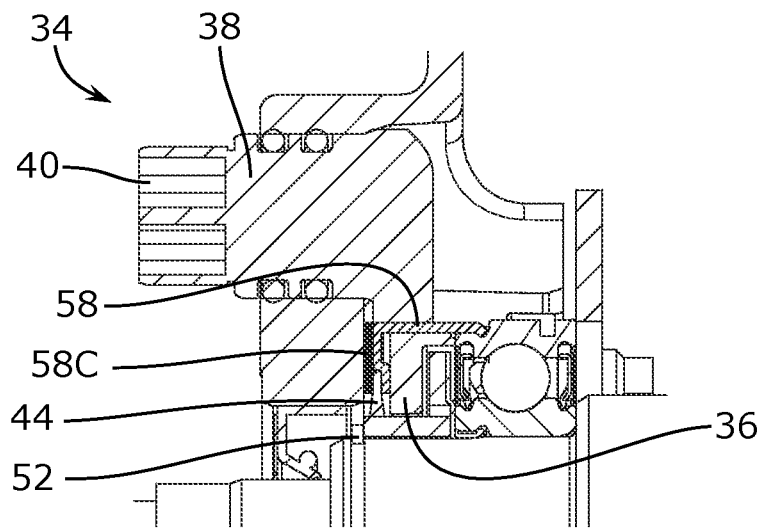
FIG. 5, a detail of an instrumented bearing according to a fifth embodiment of the invention.

According to a fifth embodiment, illustrated in FIG. 5, the leakage current collector 44 is clamped between the sheet 54 and an added part 58C, which can be a metal part welded to the end portion 58 of the sheet 54 or an insulating washer. This embodiment appears particularly simple to assemble, the leakage current collector 44 being mounted from the outside of the sheet 54.

Figure 6:
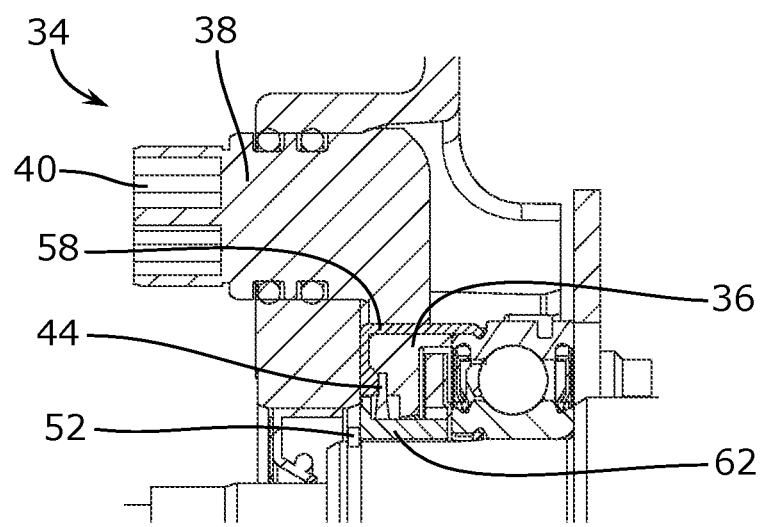
FIG. 6, a detail of an instrumented bearing according to a sixth embodiment of the invention.

According to a sixth embodiment, illustrated in FIG. 6, the sleeve 48 comprises a flange 62 projecting radially outward and toward the electrical connection 54, the leakage current collector 44 being positioned axially between the flange 62 and the read head 36. The magnetic shield is thus improved by guiding the magnetic field lines to the shaft 12. The protection of the leakage current collector 44 against external pollution (dust, oil, water) is also improved.

Naturally, the examples shown in the figures and discussed above are provided for illustrative and non-limiting purposes only. It is explicitly provided that it is possible to combine the various illustrated embodiments in order to provide others.

The invention is applicable to any type of rolling bearing or plain bearing.

The contact surface 46 of the sleeve 48 with the leakage current collector 44 can be oriented in various ways, for example perpendicular to the axis of revolution or conical. If necessary, the contact surface 46 can be incorporated into the shaft 12.

The invention claimed is:

1. An instrumented bearing, comprising:
    a stationary outer ring, forming at least one annular guide track,
    an inner ring forming at least one annular guide track located opposite the guide track of the outer ring, the inner ring being movable in rotation relative to the outer ring about an axis of revolution that is an axis of symmetry of revolution of the guide track of the outer ring and of the guide track of the inner ring,
    an annular encoder secured to the inner ring,
    a sensor assembly secured to the outer ring, the sensor assembly comprising a read head positioned opposite and at a reading distance from the encoder, and
    a leakage current collector, capable of coming into sliding contact with an annular contact that can be secured directly or indirectly to the inner ring, and
    a conductive electrical connection between the leakage current collector and the stationary outer ring,
    wherein the encoder and the read head are positioned axially between the outer ring and the leakage current collector, and the conductive electrical connection constitutes a magnetic shield made of a ferromagnetic material, extending from the outer ring to the leakage current collector by surrounding the encoder and the read head.

2. The instrumented bearing of claim 1, wherein the leakage current collector comprises a brush rubbing against the annular contact.

3. The instrumented bearing of claim 1, wherein at rest, the leakage current collector is in contact with the annular contact over an angular sector greater than 270°.

4. The instrumented bearing of claim 3, wherein at rest, the leakage current collector is in contact with the annular contact.

5. The instrumented bearing of claim 1, wherein the annular contact is formed by an annular sleeve having at least one of the following features:
   the annular sleeve extends in the axial direction so as to overlap axially with a face of the encoder that faces the read head;
   the annular sleeve extends in the axial direction so as to overlap axially with the read head;
   the annular sleeve bears indirectly against the inner ring;
   the annular sleeve is electrically connected to the inner ring;
   the annular sleeve is electrically connected to the shaft;
   the annular sleeve has a cylindrical surface for the leakage current collector; and
   the annular sleeve has a flange projecting radially outward, the leakage current collector being positioned axially between the flange and the read head.

6. The instrumented bearing of claim 1, wherein the magnetic shield has at least one of the following features:
   the magnetic shield comprises at least one sheet of ferromagnetic and electrically conductive material;
   the magnetic shield comprises a cylindrical portion covering the read head; and
   the magnetic shield comprises an end portion extending radially from an end of the cylindrical portion covering the read head radially inward and toward the leakage current collector.

7. The instrumented bearing of claim 1, wherein part of the leakage current collector is clamped between two sheets of the magnetic shield.

8. The instrumented bearing according to claim 7, wherein a first of the two sheets extends axially to form a cylindrical portion covering the read head.

9. The instrumented bearing of claim 8, wherein the second of the two sheets has at least one of the following features:
   the second of the two sheets does not extend axially to form a cylindrical portion covering the read head; and
   the second of the two sheets is positioned between the first of the two sheets and the read head.

10. The instrumented bearing of claim 8, wherein the second of the two sheets extends axially to form a cylindrical portion covering the read head.

11. The instrumented bearing of claim 8, wherein the first of the two sheets is positioned between the second of the two sheets and the read head.

12. The instrumented bearing of claim 1, wherein the magnetic shield is crimped, shrunk, glued, welded to the outer ring.

13. The instrumented bearing of claim 1, wherein the sensor assembly is secured to the outer ring via the magnetic shield.

14. The instrumented bearing of claim 1, wherein the magnetic shield comprises an opening for the passage of electrical conductors between the read head and an electrical device of the sensor assembly, positioned outside the magnetic shield.

15. The instrumented bearing of claim 14, wherein the opening is positioned in a cylindrical wall of the magnetic shield.

16. The instrumented bearing of claim 14, wherein the opening is positioned in a transverse wall of the magnetic shield.

17. The instrumented bearing of claim 1, wherein the magnetic shield comprises several superimposed sheets of ferromagnetic and electrically conductive material.

* * * * *

UNITED STATES PATENT AND TRADEMARK OFFICE
CERTIFICATE OF CORRECTION

| | | |
|---|---|---|
| PATENT NO. | : 12,152,637 B2 | Page 1 of 1 |
| APPLICATION NO. | : 17/796104 | |
| DATED | : November 26, 2024 | |
| INVENTOR(S) | : Etienne Vandamme | |

It is certified that error appears in the above-identified patent and that said Letters Patent is hereby corrected as shown below:

On the Title Page

Column 1, Item (65) Prior Publication Data, Line 1, below "Mar. 16, 2023" insert a new field entry
-- Foreign Application Priority Data Jan. 30, 2020 (FR) ....... 2000940 --

Signed and Sealed this
Eleventh Day of February, 2025

Coke Morgan Stewart
*Acting Director of the United States Patent and Trademark Office*